US006954498B1

(12) United States Patent
Lipton

(10) Patent No.: US 6,954,498 B1
(45) Date of Patent: Oct. 11, 2005

(54) INTERACTIVE VIDEO MANIPULATION

(75) Inventor: Alan J. Lipton, Falls Church, VA (US)

(73) Assignee: ObjectVideo, Inc., Reston, VA (US)

( * ) Notice: Subject to any disclaimer, the term of this patent is extended or adjusted under 35 U.S.C. 154(b) by 930 days.

(21) Appl. No.: 09/694,712

(22) Filed: Oct. 24, 2000

(51) Int. Cl.[7] .............................................. H04N 7/12
(52) U.S. Cl. ............................................. 375/240.08
(58) Field of Search ...................... 375/240.08, 240.16, 375/240.26; 348/169, 416.1, 699–700, 722, 348/575–576, 578, 580, 584, 586, 589; 725/32, 725/36, 135; 345/418, 441, 473, 719, 722, 345/723, 753, 501

(56) References Cited

U.S. PATENT DOCUMENTS

| 5,448,315 | A | 9/1995 | Soohoo .................... 348/722 |
| 5,610,653 | A | 3/1997 | Abecassis .................. 348/170 |
| 5,860,086 | A | 1/1999 | Crump et al. ............... 711/109 |
| 5,886,701 | A | 3/1999 | Chauvin et al. ............. 345/418 |
| 5,959,690 | A | 9/1999 | Toebes, VIII et al. ....... 348/578 |
| 5,987,211 | A | 11/1999 | Abecassis ................... 386/46 |
| 5,999,189 | A | 12/1999 | Kajiya et al. ............... 382/232 |
| 6,151,413 | A | 11/2000 | Jang |
| 6,166,744 | A | 12/2000 | Jaszlics et al. |
| 6,307,885 | B1 | 10/2001 | Moon et al. |
| 6,310,916 | B1 | 10/2001 | Han |
| 6,326,964 | B1 * | 12/2001 | Snyder et al. .............. 345/419 |
| 6,351,265 | B1 | 2/2002 | Bulman |
| 6,351,492 | B1 | 2/2002 | Kim |
| 2003/0051255 | A1 * | 3/2003 | Bulman et al. ............. 725/135 |

OTHER PUBLICATIONS

H. Fujiyoshi and A. J. Lipton, "Real-time Human Motion Analysis by Image Skeletonization," *Proceedings of IEEE WACV'98*, Princeton, NJ, 1998, pp. 15-21.

A. J. Lipton, H. Fujiyoshi and R. S. Patil, "Moving Target Classification and Tracking from Real-time Video," *Proceedings of IEEE WACV'98*, Princeton, NJ, 1998, pp. 8-14.

A. J. Lipton, "Local Application of Optic Flow to Analyse Rigid Versus Non-Rigid Motion," *International Conference on Computer Vision*, Corfu, Greece, Sep. 1999.

R. T. Collins, Y. Tsin, J. R. Miller, and A. J. Lipton "Using a DEM to Determine Geospatial Object Trajectories," CMU-RI-TR-98-19, 1998.

A. Selinger and L. Wixson, "Classifying Moving Objects as Rigid or Non-Rigid Without Correspondences," *Proceedings of DARPA Image Understanding Workshop*, Nov. 1, 1998, pp. 341-347.

Alan J. Lipton "Virtual Postman-An Illustrative Example of Virtual Video," *International Journal of Robotics and Automation*, vol. 15, No. 1, Jan. 2000, pp. 9-16.

Alan J. Lipton "Virtual Postman—Real-Time, Interactive Virtual Video," IASTED Conference on Computer Graphics and Imaging (CGIM '99), Palm Springs, Oct. 25-27, 1999.

Robert T. Collins et al., "A System for Video Surveillance and Monitoring," Technical Report CMU-RI-TR-00-12, Robotics Institute, Carnegie Mellon University, May 2000.

Jemez Technology Corp., Variant iD Web-Site, www.variantid.com, printed Aug. 25, 2003.

* cited by examiner

*Primary Examiner*—Vu Le
(74) *Attorney, Agent, or Firm*—Venable LLP; Michael A. Sartori

(57) ABSTRACT

In a system for video processing, an object of interest is extracted from a video stream. The object from said video stream is analyzed and manipulated to obtain a synthetic character. A virtual video is assembled using the synthetic character.

54 Claims, 8 Drawing Sheets

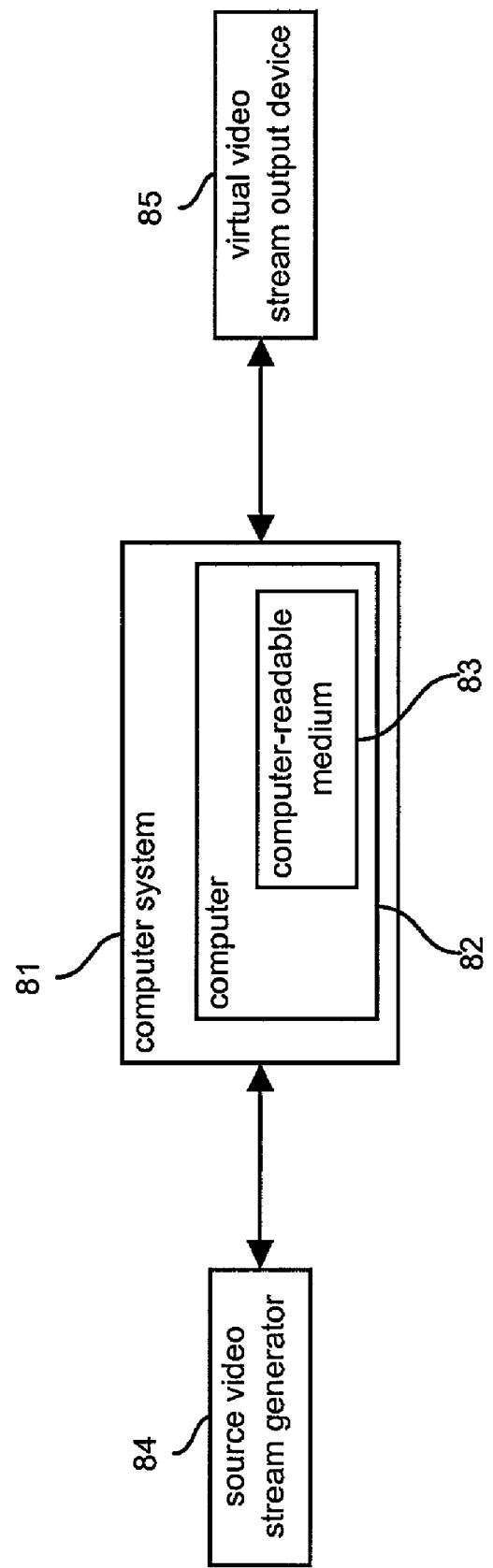

INTERACTIVE VIDEO MANIPULATION

BACKGROUND OF THE INVENTION

Field of the Invention

A system in the field of video processing is disclosed. More specifically, techniques are disclosed for interacting with and manipulating video streams for applications, such as entertainment, education, video post-production, gaming, and others.

REFERENCES

For the convenience of the reader, the references referred to herein are listed below. In the specification, the numerals within brackets refer to respective references. The listed references are incorporated herein by reference.

[1] H. Fujiyoshi and A. Lipton, "Real-Time Human Motion Analysis by Image Skeletonization," *Proceedings of IEEE WACV '98*, Princeton, N.J., 1998, pp. 15–21.

[2] A. Lipton, H. Fujiyoshi and R. S. Patil, "Moving Target Detection and Classification from Real-Time Video," *Proceedings of IEEE WACV '98*, Princeton, N.J., 1998, pp. 8–14.

[3] A. J. Lipton, "Local Application of Optic Flow to Analyse Rigid Versus Non-Rigid Motion," *International Conference on Computer Vision*, Corfu, Greece, September 1999.

[4] A. Selinger and L. Wixson, "Classifying Moving Objects as Rigid or Non-Rigid Without Correspondences," *Proceedings of DARPA Image Understanding Workshop*, 1, November 1998, pp. 341–47.

Background of the Invention

In augmented reality, which is a research topic in the computer vision community, video imagery is augmented by accurately registered computer graphics. Computerized x-ray vision and video assisted surgery are two examples of augmented reality. One of the long-time goals of computer vision community is to analyze and interact directly with real-time video-derived data.

One of the long-time goals of the entertainment industry, such as the movie industry and the computer gaming industry, is the creation of realism. To achieve this, the movie industry invested in computer graphics to create realistic false images. Additionally, the computer gaming industry integrates photo-realistic still imagery and video to enhance a user's experience. To date, this integration is largely non-interactive using only "canned" video sequences to achieve little more than setting atmosphere.

Examples of the early use of imagery in games include still images or canned video sequences as a backdrop to the action, with computer generated characters overlaid on top, rather than truly interacting with the action. A slightly more interactive use of video is displayed in more recent games, such as Return to Zork™ and Myst™, in which short, relevant video sequences provide the player with timely information or atmosphere. The most interactive use of video has been in video-disc based games, like Dragon's Lair™, in which the game itself is made up of small image sequences, each containing a small problem or challenge. Based on the player's choice, the next appropriate video sequence is selected to provide the next challenge exploiting the fast random access time available to the videodisc medium.

There has been some effort made to use video interactively, most notably as an input device. There exist companies that produce games based on chroma key screen technology. Real players are inserted into a virtual environment to perform simple actions like tending a virtual soccer goal or shooting virtual baskets. These games require considerable infrastructure. The player must wear distinguishing clothing, for example, green gloves, so that the computer recognizes body parts, and the game is played in front of a large blue screen stage. More modest applications of this type that run on desktop computers include, for example, SGI's Lumbus™, in which the IndyCam is used for simple head or hand tracking to control a plant-like creature called a "Lumbus" in three-dimensional (3D) space.

SUMMARY OF THE INVENTION

It is an object of the invention to provide a system and techniques to accomplish real-time and non-real time interactive video manipulation.

It is a further object of the invention to provide a system and techniques to apply interactive video processing to applications such as entertainment, simulation, video editing, and teleconferencing.

These and other objects are achieved by the invention, which is embodied as a method, a system, an apparatus, and an article of manufacture.

The invention includes a method comprising the steps of: extracting an object of interest from a video stream; analyzing said object from said video stream to obtain an analyzed object; manipulating said analyzed object to obtain a synthetic character; and assembling a virtual video using said synthetic character. The method further comprises the step of tracking said object. The step of assembling comprises the step of inserting the synthetic character into said video stream. The step of assembling comprises removing said synthetic character from said video stream. The method further comprises the step of determining functional areas within said video stream.

The invention includes a method comprising the steps of: obtaining a video stream as a setting for one of a video game, a simulation, a teleconference, and a distance education presentation; tracking a moving object in said video stream; analyzing said moving object to obtain an analyzed moving object; generating a synthetic character based on said analyzed moving object; and assembling a virtual video based on said synthetic character and said video stream.

The invention includes a method comprising the steps of: extracting in real time a background model from a video stream; generating in real time a synthetic character; and assembling in real time a virtual video based on said background model and said synthetic character. The step of generating comprises generating said synthetic character using a computer graphics engine, an object extracted from the video stream, or using both a computer graphics engine and an object extracted from the video stream.

The system of the invention includes a computer system to perform the method of the invention.

The system of the invention includes means for processing to perform the method of the invention.

The apparatus of the invention includes a computer to perform the method of the invention.

The apparatus of the invention includes application-specific hardware to perform the method of the invention.

The apparatus of the invention includes a computer-readable medium comprising software to perform the method of the invention.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

Definitions

In describing the invention, the following definitions are applicable throughout.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

The above, as well as other aspects of the inventive system and techniques, are further explained via the description below, taken in combination with the drawings, in which:

FIG. 8 illustrates a plan view for the invention.

DETAILED DESCRIPTION OF THE INVENTION

"Virtual video," which is a term coined by the inventor, is the concept that a video stream is altered in real-time and treated as a virtual world into which one or more objects are interactively inserted or removed at will. Furthermore, augmentations to the video stream are derived directly from the video stream, rather than being solely computer generated. Thus, "real" objects appear to move through space and/or time in a synthetic manner.

Two fundamental challenges of virtual video are: (1) the ability to remove seamlessly a character from a video stream; and (2) the ability to add seamlessly a synthetic character to a video stream. A synthetic character is derived from the video stream itself, and thus, the motion of the synthetic character must be understood to re-create the synthetic character accurately in different times and places.

In describing the invention, reference is made to Virtual Postman, which is a video game developed by the inventor to demonstrate and experiment with virtual video techniques. With virtual video, real-time, live interactive video is used for the first time as a game playing field. In Virtual Postman, a camera is pointed at a scene, either indoor or outdoor, and the video stream is viewed by a user (e.g., a player) on a desktop computer. Moving objects, like vehicles and people, are detected and presented to the player as "targets." The player simulates shooting the targets, which appear to expire in computer generated explosions. "Dead" targets are synthetically removed from the video stream in real-time. Furthermore, the dead targets are, at random, synthetically brought back to "life" as "zombies" enhanced by computer graphics and re-inserted into the video stream at any position and/or time.

There are several situations when it is necessary to insert synthetic characters into the virtual video stream in the context of Virtual Postman. When a "dead" character is brought back to life, the dead character must appear to interact with the environment in a realistic manner. A subtler situation is when a "live" character is occluded by a "dead" one. Here, because no imagery in the video stream exists to represent the "live" character, synthetic imagery is inserted to complete the real segments without apparent discontinuity to the user. To achieve this, the appearance of the motion of a character is modeled. For the purposes of Virtual Postman, a character which is a vehicle is assumed to be rigid and move with non-periodic motion, and a character which is a human or an animal is assumed to be non-rigid and move with periodic motion. Hence, for Virtual Postman, it is only necessary to determine the rigidity and periodicity of a character.

Figure 1:
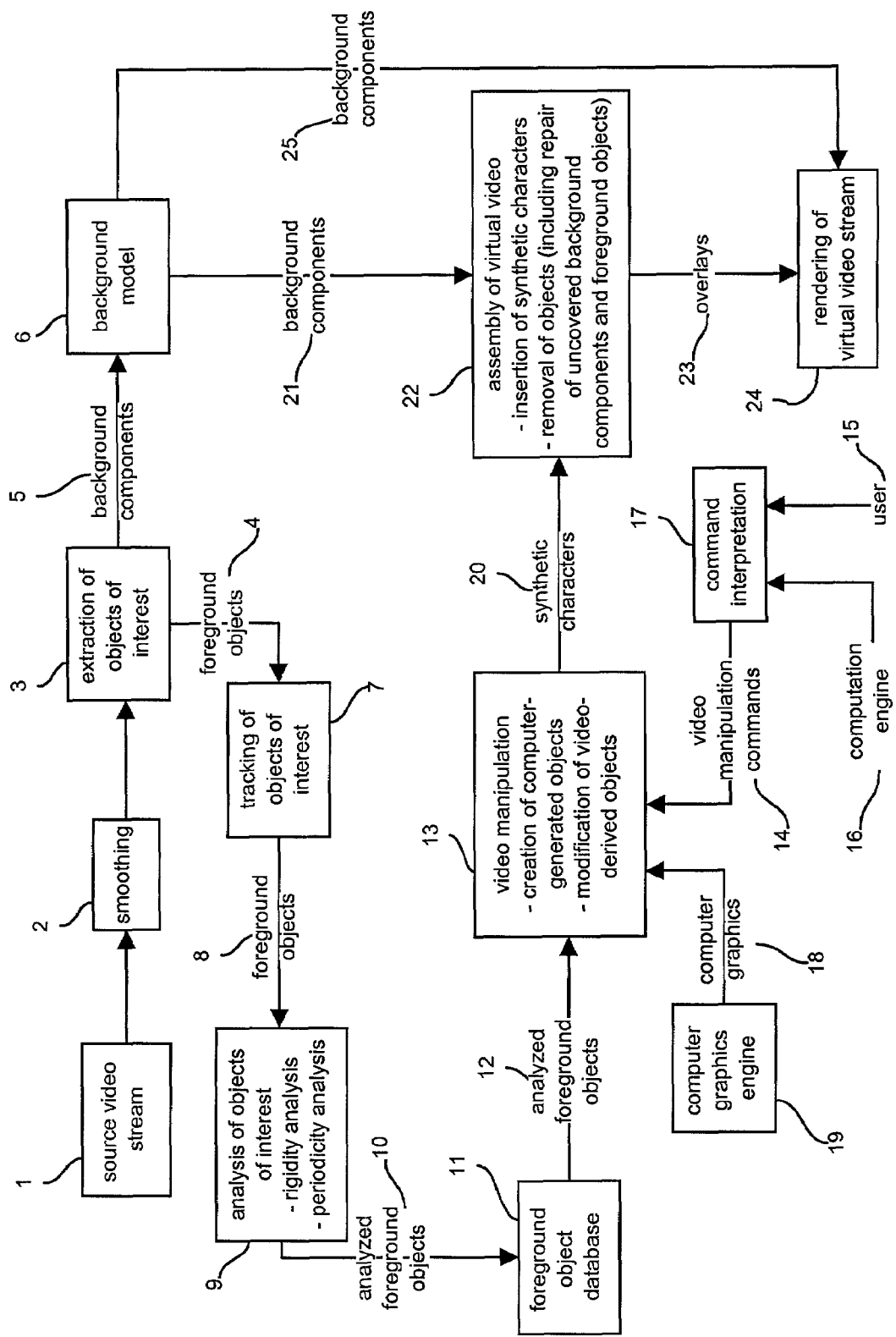
FIG. 1 illustrates an overview of a virtual video architecture for the invention.

FIG. 1 illustrates an overview of a virtual video architecture for the invention. The architecture is able to operate in real time or non-real time. An example of non-real time operation is using the invention to perform video editing.

In block 1, a source video stream is obtained. Examples of the source video stream include: a video stream input in real time from a camera, such as a digital video camera, a color camera, and a monochrome camera; a video stream generated via computer animation; a video input to a computer, such as from a firewire digital camera interface or through digitization; a video stream stored on a computer-readable medium; and a video stream received via a network.

In block 2, the video stream is smoothed. Preferably, the video stream is smoothed by applying a Gaussian filter to each frame. As an option, other filters are used to achieve desired smoothing properties and processing speed. As an option, block 2 is skipped, which is likely to be beneficial if the video stream is computer generated.

In block 3, one or more objects of interest are extracted from the smoothed video stream. The video stream is segmented into foreground objects (or blobs) 4 and background components 5. An object extracted in a frame of the video stream is identified as a foreground object 4, and the remainder of the frame is identified as background components 5. A foreground object is one or more pixels in a frame that are deemed to be in the foreground of the frame because the pixels do not conform to a background model of the frame.

An object of interest is any object in a frame that is of interest to a user and/or for the generation of the virtual video stream. Examples of an object of interest include: a moving object, such as a person or a vehicle; a geographical region, such as a doorway; and a consumer product, such as furniture or clothing.

Numerous techniques are available for extracting an object from a video stream. For example, some approaches are model-based and identify specific types of objects, such as vehicles or people. Other approaches us segmentation, while others use motion detection schemes. Preferably, foreground object extraction is accomplished using a stochastic background modeling technique, such as dynamically adaptive background subtraction. Dynamically adaptive background subtraction is preferred for two reasons. First, dynamically adaptive background subtraction provides a desirably complete extraction of a moving object. Second, a by-product of the motion detection is a model of the background in the video stream, which is provided to block 6.

The preferred technique of dynamically adaptive background subtraction employs motion detection to extract objects from a frame as described in [2] and has several steps. First, a stochastic model of each pixel is created and includes a mean and a threshold pair (B,T) for each pixel, where B represents the mean value of the pixel intensity and T represents a number of standard deviations. Preferably, the stochastic model is an infinite impulse response (IIR) filtered Gaussian model. Preferably, the mean and standard deviation are computed from the red-green-blue (RGB) values of the pixel over time with R, G, and B treated separately. Thus, the model contains three means and variances for each pixel location, and the procedure is applied to each color band in an identical fashion. Instead of using RGB values, other chromatic representations of the color space are possible, for example: monochrome; hue-saturation value (HSV); YUV, where Y represents the luminosity of the black and white signal, and U and V represent color difference signals; cyan-magenta-yellow (CYN); and cyan-magenta-yellow-black (CYN).

Second, using this pair designation (B,T) for each pixel, a pixel having an intensity value greater than T color levels from B is considered a foreground pixel and is otherwise considered a background pixel.

Third, a first frame $I_0$ of the video stream is taken as the initial background model $B_0$, and the initial threshold $T_0$ is set to a default value.

Fourth, a binary motion mask image $M_n$ is determined and contains a "1" at each pixel which represents a "moving" pixel and "0" at each pixel which represents a "non-moving" pixel. A "moving" pixel is a pixel that does not conform to the background model and is, hence, considered to be in the foreground, and a "non-moving" pixel is a pixel that does conform to the background and is, hence, considered to be in the background. At each frame n, "moving" pixels are detected with the binary motion mask image $M_n(x)$ for pixel x of frame n as follows:

$$M_n(x) = \begin{cases} 1 & \text{if } |I_n(x) - B_{n-1}(x)| > T \\ 0 & \text{if } |I_n(x) - B_{n-1}(x)| \leq T \end{cases} \quad (1)$$

where n is the subsequent frame, n−1 is the previous frame, and T is an appropriate threshold.

Fifth, the stochastic models of the "non-moving" pixels are updated. The B value for each pixel is updated using an IIR filter to reflect changes in the scene (e.g., illumination, which makes the technique appropriate to both indoor and outdoor settings):

$$B_n(x) = \begin{cases} B_{n-1}(x) & \text{if } M_n(x) = 1 \\ \alpha I_n(x) + (1-\alpha) B_{n-1}(x) & \text{if } M_n(x) = 0 \end{cases} \quad (2)$$

where α is the filter's time constant parameter. Further, the threshold T for each non-moving pixel is updated using an IIR filter as follows:

$$T_n(x) = \begin{cases} T_{n-1}(x) & \text{if } M_n(x) = 1 \\ \alpha\kappa|I_n(x) - B_{n-1}(x)| + (1-\alpha) T_{n-1}(x) & \text{if } M_n(x) = 0 \end{cases} \quad (3)$$

where κ represents the number of standard deviations.

Sixth and finally, clusters of "moving" pixels are clustered into "blobs" by preferably using a connected component algorithm. As an option, any clustering scheme is used to cluster the "moving" pixels.

With the preferred technique for extracting objects via motion detection, two benefits occur. First, the resulting dynamic background model contains the most recent background image information for every pixel, including the pixels that are occluded. Second, the extracted moving objects are complete and contain neither background pixels nor holes. The extracted moving objects are ideal templates to be removed and inserted into the virtual video stream. Consequently, removing characters from the video stream is achieved by replacing the pixels of the characters with the corresponding background pixels from $B_n$.

Figure 2:
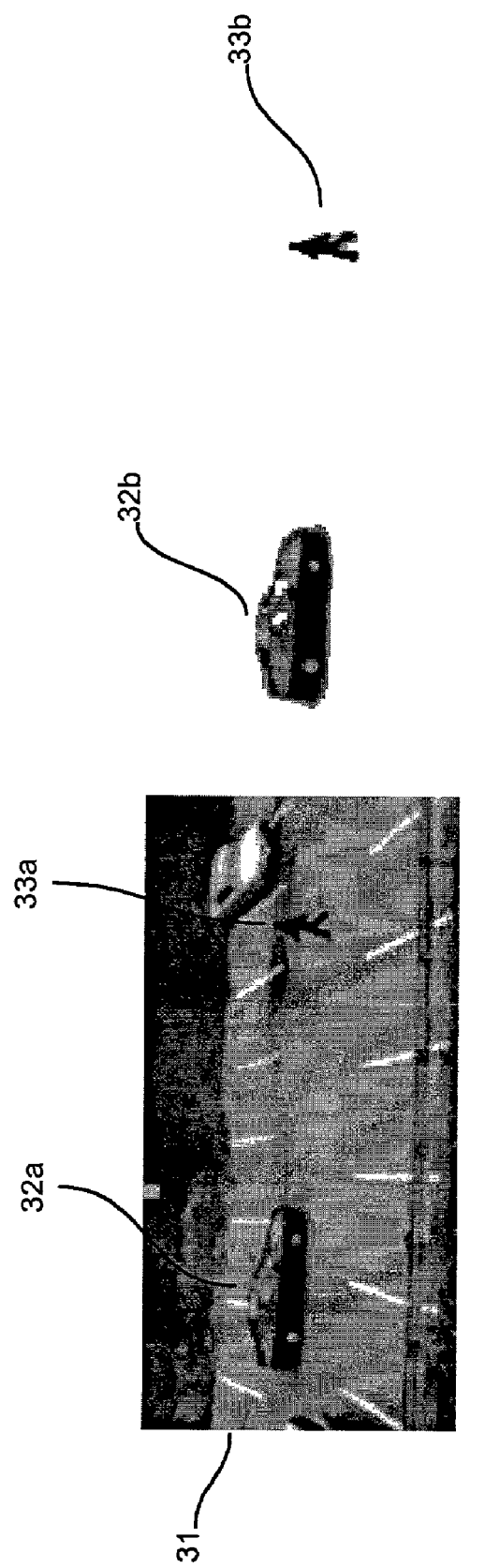
FIG. 2 illustrates an example extraction of foreground objects in a video stream.

FIG. 2 illustrates an example extraction of foreground objects in a video stream. Specifically, FIG. 2 illustrates blobs extracted from a frame of a video stream in Virtual Postman. From frame 31, individual blobs 32a and 33a are extracted as extracted blobs 32b and 33b, respectively. Blob 32a represents a vehicle, and blob 33b represents a person.

In block 6, the background components 5 extracted in block 3 are stored as a background model. When determining the background model, no foreground objects are preferably present in the frame. With a clean background model, removing "dead" characters is able to be realistically accomplished. The background model 6 provides background components 21 for assembling the virtual video in block 22. The background components 21 are used in block 22 to insert synthetic objects and remove objects. The background model 6 also provides background components 25 for rendering the virtual video stream in block 24.

In block 7, the foreground objects 4 are tracked to obtain tracked foreground objects 8. A foreground object is identified as a character (or a blob, or a target) and is distinguished from other characters and the background components. A character is tracked through occlusions with other characters and background objects. Proper tracking of a character ensures that a removed character is not accidentally reinstated in the virtual video stream.

To track a character in a video stream, numerous techniques are available. For example, a character is tracked using Kalman filtering or the CONDENSATION algorithm. With the invention, because video-derived characters are tracked, a template matching technique, such as described in [2], is preferably used. More preferable, an extension of the template matching technique that provides for tracking multiple objects through occlusion is used as described in [3]. With the template matching technique in [3], as a character is tracked, templates are collected showing visual variability over time. These image sequences are useful for generating synthetic character based on the tracked character.

For the preferred technique, a standard frame-to-frame tracking algorithm is employed as described in [3] and has several steps. First, a known character from previous frames is selected and its position is predicted into the coordinate system of the current frame using the previously computed velocity of the character.

Second, blobs extracted from the current frame are identified as candidate matches based on the proximity of each blob to the predicted position of the character. The position of the character is predicted based on the previous motion of the character.

Third, using a template matching algorithm, the candidate blob which best matches the character is selected to define the position of the character in the current frame. Preferably, the template matching algorithm is a standard sum of absolute difference (SAD) algorithm and involves convolving the character with the blob and taking the sum of the absolute differences of the pixel values for each pixel location. The result is a correlation surface D for each candidate blob. A low value for the SAD correlation indicates a good match, and the candidate blob with the minimum SAD correlation value is selected as the new position of the character. The displacement that corresponds to the minimum of the SAD correlation is considered to be the frame-to-frame displacement of the character.

Fourth and finally, the character is updated with the new information in the subsequent frame. The process repeats until either the character exits the video stream or the video stream ends.

In block 9, the tracked foreground objects (or characters) 8 are analyzed to obtain analyzed foreground objects 10. Preferably, the analysis includes: (1) performing a rigidity analysis; and (2) performing a periodicity analysis. Through this analysis, a synthetic character, such as a video-derived character, is able to be generated from the foreground object and inserted into the virtual video stream as a realistic synthetic character.

For the rigidity analysis, a character is classified as being a rigid character or a non-rigid character. With a rigid character, like a vehicle, less information is required to generate a synthetic character based on the rigid character, and with a non-rigid character, like a person, more information is required to generate a synthetic character based on the non-rigid character. The type of information required for a rigid character and a non-rigid character is discussed with respect to determining a periodic sequence for a character.

View invariant approaches exist for determining character rigidity. For example, character rigidity is determined using image matching or image skeletons, which determines walking and running of humans [1]. Preferably, character rigidity is determined as described in [3] by examining internal optic flow of a character.

Preferably, the rigidity of a character is determined by the optical residual flow of the character, as described in [3]. A local optic flow computation is applied to a tracked character to produce a flow field $\bar{v}(x)$ for the pixels in that character. The residual flow $\bar{v}_R$ is a measure of the amount of internal visual motion within the character. In this case, $\bar{v}_R$ is the standard deviation of the flow vectors:

$$\bar{v}_R = \frac{\sum_p |\bar{v}(x) - \bar{v}|}{p} \tag{4}$$

where $\bar{v}$ is the average flow vector, and p is the number of pixels in the image of the character. If the residual flow $\bar{v}_R$ for a character is low, the character is assumed to be a rigid character, and if the residual flow $\bar{v}_R$ for a character is high, the character is assumed to be a non-rigid character.

Figure 3:
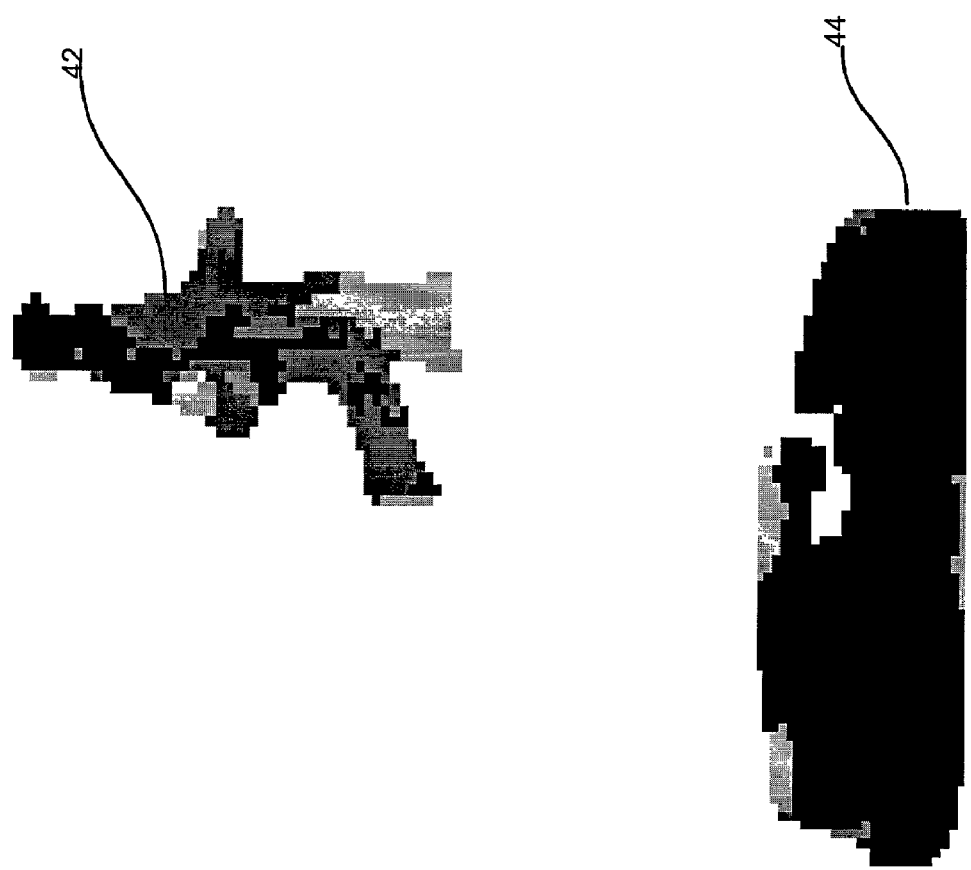
FIGS. 3 and 4 illustrate an example for determining object rigidity based on residual flow.
Figure 4:
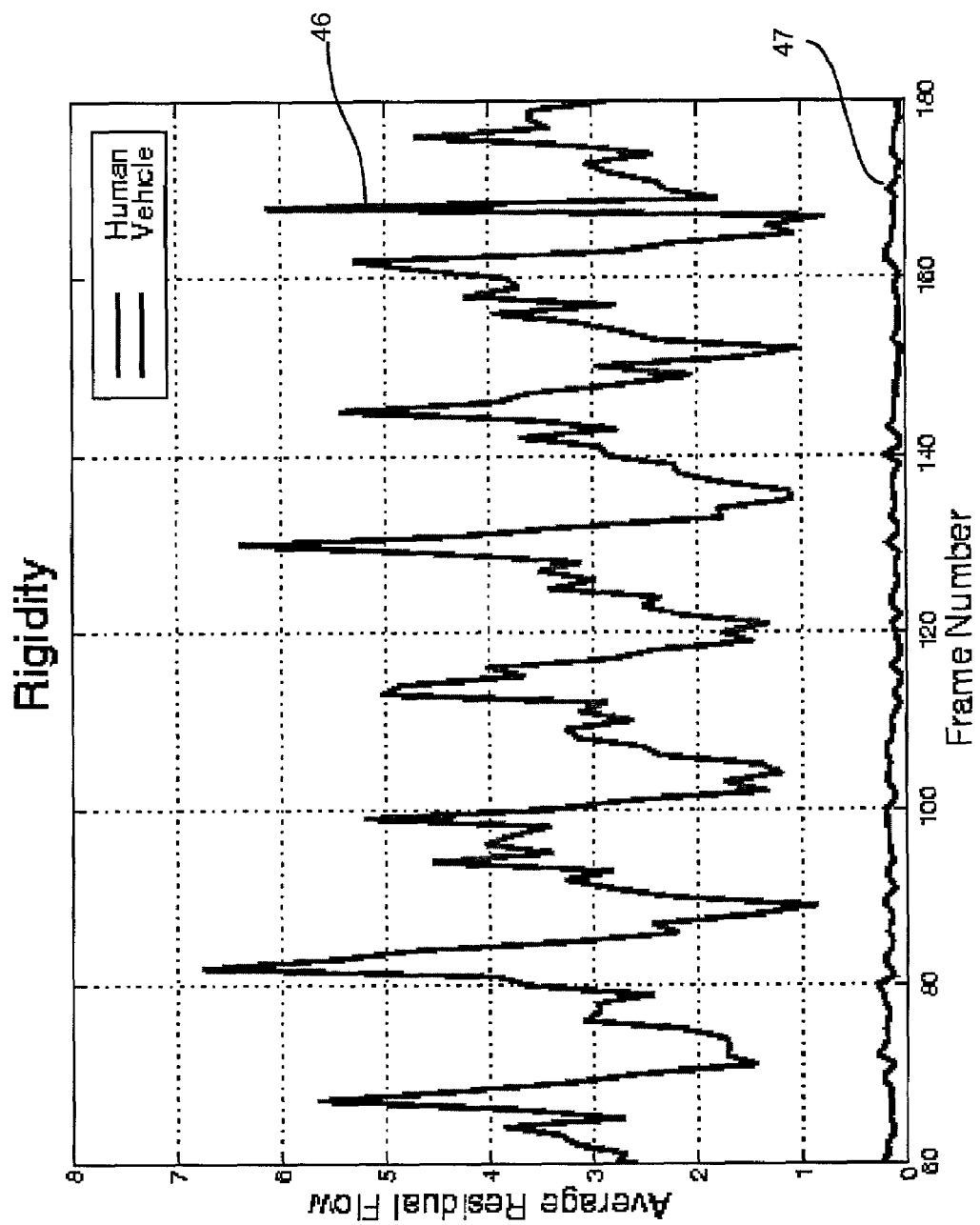

FIGS. 3 and 4 illustrate an example for determining character rigidity based on residual flow. The example is taken from Virtual Postman. FIG. 3 illustrates a clustering 42 based on a residual flow field $\bar{v}(x)$ for a human (non-rigid) character. FIG. 3 also illustrates a clustering 44 based on a residual flow field $\bar{v}(x)$ for a vehicle (rigid) character. Arms and legs are apparent in the human cluster 42, while there is only one significant area apparent for the vehicle cluster 44.

FIG. 4 illustrates the results of the residual flow computations for the residual flow fields of FIG. 3. The residual flows $\bar{v}_R$ are computed over time for a sequence of frames in the video stream containing the two characters. The residual flow 46 for the human character has a high average residual flow, and the human character is considered to be a non-rigid character. The residual flow 47 for the vehicle character is low, and the vehicle character is considered to be a rigid character. The residual flow 46 of the human character also reflects the periodic nature of a human moving with a constant gait.

After the rigidity analysis is completed, the periodicity analysis is performed for block 9. Depending on whether the character is rigid or non-rigid, different information on the periodic sequence of the character is used. To determine the periodicity and the periodic sequence for a character, the motion of the character is analyzed. View invariant approaches exist for determining periodicity of a moving object. For example, using image matching or image skeletons, walking and running of a human is determined and results in determining the periodicity of the human [1]. Preferably, the periodic sequence of a character is determined by an image matching technique.

Preferably, a periodicity model for a non-rigid object is generated and includes an image sequence representing a complete cycle of the motion of the non-rigid object and a displacement sequence representing the spatial relationship between each image. Preferably, for a rigid character, only one sample of the image of the rigid character is required for the periodic sequence of the rigid character. In the virtual video stream, the periodic sequence of the rigid or non-rigid character is repeated, scaled, translated, inverted, enhanced by computer graphics, etc., to simulate the character appearing in any position and/or at any time and to create a realistic synthetic character.

For a non-rigid character, periodic motion is assumed for the character. The periodic sequence $P(k)=\{\Omega_k, d_k\}$ is extracted from the frames of the video stream in which the character appears, where $\Omega_k$ represents the visual appearance of the character at frame k, and $d_k$ represents the velocity (or frame-to-frame displacement) of the character from frame k to frame k+1. The periodic sequence P(k) represents the character exhibiting one cycle of motion over a set of frames $k \epsilon [P_0, P_N]$, where $P_0$ represents the first frame in the periodic sequence, and $P_N$ represents the last frame in the periodic sequence.

For a rigid character, the periodic sequence includes only one pair $\{\Omega_0, d_0\}$, where $\Omega_0$ is a good view of the rigid character and do is the frame-to-frame displacement, in pixels per frame (or pixels per second), of the rigid character.

Periodicity is preferably determined by a method similar to that discussed in [4] and has several steps. First, for each instance of a character detected in the video stream, visual templates are collected over time, which result in a series of visual templates $\Omega_1, \ldots, \Omega_n$ for the character for frames 1 to n. The frame-to-frame displacements $d_1$ to $d_n$ are also collected for frames 1 to n. A sufficient number of visual templates are collected to insure that at least one cycle of character motion is accounted for by the series of visual templates.

Second, visual template $\Omega_n$ is matched with each of the collected visual templates $\Omega_1, \ldots, \Omega_n$ using the SAD correlation algorithm discussed above for tracking a foreground object.

Third, visual template $\Omega_k$ is identified from among the visual templates $\Omega_1, \ldots, \Omega_n$ as the visual template having the minimum correlation value determined in the second step. Visual template $\Omega_k$ is the closest visual template in appearance to the visual template $\Omega_n$ and is selected as the first visual template in the periodic sequence. Visual template $\Omega_{n-1}$, is selected as the last visual template in the periodic sequence.

Figure 5:
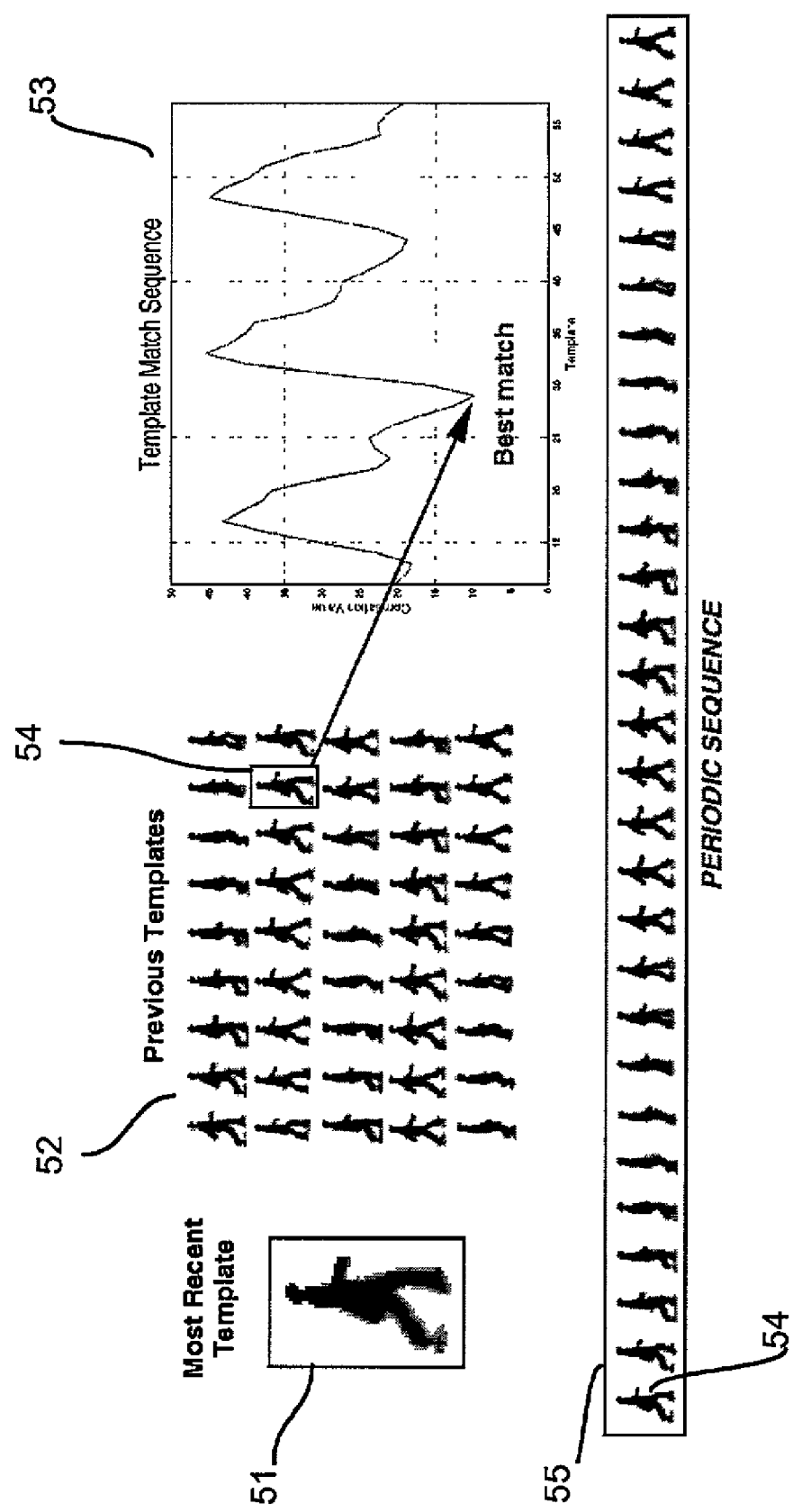
FIG. 5 illustrates an example for determining a periodic sequence corresponding to a non-rigid character.

FIG. 5 illustrates an example of determining a periodic sequence for a non-rigid character. The example is taken from Virtual Postman, and the non-rigid character in FIG. 5 is a human. The most recent template 51 is compared (i.e., convolved) with previous templates 52, and the results are plotted as a template match sequence 53. The previous template 54 that most closely matches the most recent template 51 has a minimum for the template match sequence 53 and is considered to mark the beginning of a periodic sequence 55.

In block 11, the analyzed foreground objects 10 are stored in a foreground object database. For example, for a character, the following are stored: the set of positions and velocities of the character over the lifetime of the character in the video stream; and the periodic sequence of the character. The foreground object database 11 provides stored analyzed foreground objects 12 to produce the virtual video stream.

In block 13, video manipulation is performed to produce synthetic characters 20. As input, video manipulation receives analyzed foreground objects 12 from the foreground object database 11, video manipulation commands 14 from one or more users 15 and a computation engine 16 via command interpretation 17, and computer graphics 18 from a computer graphics engine 19. Preferably, video manipulation includes: (1) performing creation of computer-generated objects, and (2) performing modification of video-derived objects, such as modifying appearance, scale, position, speed, direction of motion, and/or timing of video-derived objects.

A synthetic character produced by video manipulation 13 includes many examples. First, a synthetic character includes a video-derived character derived exclusively from the source video stream in block 1 using the analyzed foreground objects 12 from the foreground object database 11. If the synthetic character is a pass-through of the video-derived character (i.e., no modifications are made to the video-derived character), the analyzed foreground objects 12 preferably include the set of positions and velocities of the character over the lifetime of the character in the video stream. On the other hand, if the synthetic character is not a pass-through of the video-derived character (i.e., modifications are made to the video-derived character), the analyzed foreground objects 12 preferably include the periodic sequence of the character.

Second, a synthetic character includes a video-derived character derived exclusively from a video stream other than the source video stream in block 1 using the analyzed foreground objects 12 previously stored in the foreground object database 11. With this example, a character from a previous video stream is spliced into the current source video stream. If the synthetic character is a pass-through of the video-derived character, the analyzed foreground objects 12 preferably include the set of positions and velocities of the character over the lifetime of the character in the video stream. On the other hand, if the synthetic character is not a pass-through of the video-derived character, the analyzed foreground objects 12 preferably include the periodic sequence of the character.

Third, a synthetic character includes a computer-derived character completely generated by computer graphics 18 from the computer graphics engine 19.

Fourth, a synthetic character includes a hybrid character derived as a hybrid of the analyzed foreground objects 12 and computer graphics 18.

Fifth, a synthetic character includes a character synthesized based on video manipulation commands 14, which direct the generation of a synthetic character in the above examples. The manipulation commands 14 determine, for example, the appearance, scale, position, speed, direction of motion, and/or timing of a synthetic character. The video manipulation commands 14 also identify occluded characters, which are addressed using synthetic characters.

Examples of a synthetic character in Virtual Postman include: a synthetic character representing an actual "live" character; a synthetic character representing an actual "live" character if the actual "live" character is occluded in the video stream by a "dead" (removed) character; a synthetic character representing a zombie of a "dead" character inserted at a fictitious location and/or time in the virtual video stream when the "dead" character is brought back to life as the zombie; a synthetic character as a completely computer generated image, such as when a "live" character is blown apart; and a synthetic character as a hybrid, namely a computer enhanced "live" character, such as when the appearance of a "zombie" is modified using a computer graphics engine.

When producing a synthetic character based on a video stream, the synthetic character is generated with, for example, arbitrary appearance, scale, position, speed, direction of motion, and/or timing in the virtual video stream. To produce a synthetic character 20 based on a periodic sequence of a video-derived character, the stored periodic sequence $P(k)=(\Omega_k, d_k)$ of the character is obtained from the foreground object database 11. A starting frame $I_0$ and a position $x_0$ in the virtual video stream are selected based on video manipulation commands 14. The periodic sequence $P(k)=(\Omega_k, d_k)$ is scaled in size by a factor K and in time by a factor T. If necessary, a flip operator $F(\Omega)$ is applied to the images to make the synthetic character move in a direction opposite to that in which the synthetic character was moving in the source video stream 1. The parameters K, T, and $F(\Omega)$ are selected based on video manipulation commands 14. At each subsequent frame $I_n$, the position $x_n$ of the synthetic character is:

$$x_n = x_{n-1} + T \times d_{(n-1) \bmod P_N} \tag{5}$$

where $P_N$ is the size of $P(k)$. The appearance of the synthetic character is $$K \times \Omega_{n \bmod P_N} \tag{6}$$

or $$K \times F(\Omega_{n \bmod P_N}) \tag{7}$$

A special case of producing a synthetic character occurs when a "live" character is occluded by a "dead" character, as in Virtual Postman, or some static occlusion in the scene occurs. In this case, the frame in which the occlusion is about to occur is determined, and a periodic sequence for the occluded character during the time period is obtained from the foreground object database 11. A synthetic character with scale factors T=K=1 is added to the virtual video stream for as long as the occlusion lasts. Determining an occlusion is accomplished using a pixel contention technique.

Preferably, the pixel contention technique discussed in [3] is used and employs finding patterns of optic flow to detect occlusion of a character. In particular, a pixel contention metric is used to detect when occlusion occurs and to extract the spatial ordering. The object in the front (i.e., the non-occluded object) displays less pixel contention than the object in the rear (i.e., the occluded object).

When an occlusion occurs in a three-dimensional environment, the occlusion appears as a two-dimensional deformation. When this occurs, the total number of pixels for the object decreases, and a contention exists between pixels for good matches during residual flow computation. In some cases, multiple pixels in frame $I_n$ match with single pixels in frame $I_{n+1}$. This pixel contention property, $P_c$, provides a good measure of occlusion.

Pixel contention is measured by counting the number of pixels in $\Omega_n$ that either have flow vectors terminating at a common pixel of $\Omega_{n+1}$ or are poorly matched to pixels of $\Omega_{n+1}$. This count is normalized by dividing the count by the size X of $\Omega$ (i.e., the size of the image of the character in pixels).

A contended pixel $x_c$ exists if there exists a pair of image points $(x_0, x_1)$ such that $$x_0 + \bar{v}(x_0)\delta t = x_c \tag{8}$$

and $$x_1 + \bar{v}(x_1)\delta t = x_c. \tag{9}$$

The other condition for $x_c$ is $$\min_d D(x_c; d) > T_c, \tag{10}$$

where $T_c$ is a threshold for determining a valid region match. As in the case of the threshold used above in equation (1) for determining the binary motion mask $M_n$, the threshold $T_c$ is also set based on the statistical properties of the video stream. Pixel contention is then defined as $$P_c = \frac{\#\{x_c\}}{X}, \tag{11}$$

where $\#\{\bullet\}$ is a counting operator, which, in this case, counts the number of occluded pixels.

In the case of one object, $\Omega$, occluding a second object, $\Psi$, the spatial ordering of the two objects is determined. With self-occlusion, the occluded object is assumed to have a greater pixel contention than the occluding object. However, the absolute number of contended pixels may not be a good measure if one object is very large compared to the other object (e.g., compare the front-most character 67 with the occluded character 68 in FIG. 6). To account for such situations, pixel contention is normalized with respect to the expected value of pixel contention for a particular object as in equation (11).

While occlusion is occurring, the occluded pixel contention $P_c$ is calculated for each of the two objects $\Omega$ and $\Psi$, and each of the calculated pixel contentions is normalized with respect to the expected pixel contention for the corresponding object, which is measured prior to the occlusion. Let $\overline{P_{c\Omega}}$ and $\overline{P_{c\Psi}}$ be the expected pixel contentions of $\Omega$ and $\Psi$, respectively. A normalized occluding pixel contention is determined for each of $\Omega$ and $\Psi$ using $$P_{o,i} = \frac{P_{c,i}}{\overline{P_{c,i}}}, \tag{12}$$

where $i\gamma\{\Omega, \Psi\}$, and $P_{o,i}$ represents the normalized occluding pixel contention for object i. The object having the larger value of $P_{o,i}$ is taken as corresponding to the occluded object, while the object having the smaller value of $P_{o,i}$ is taken as corresponding to the occluding object.

Figure 6:
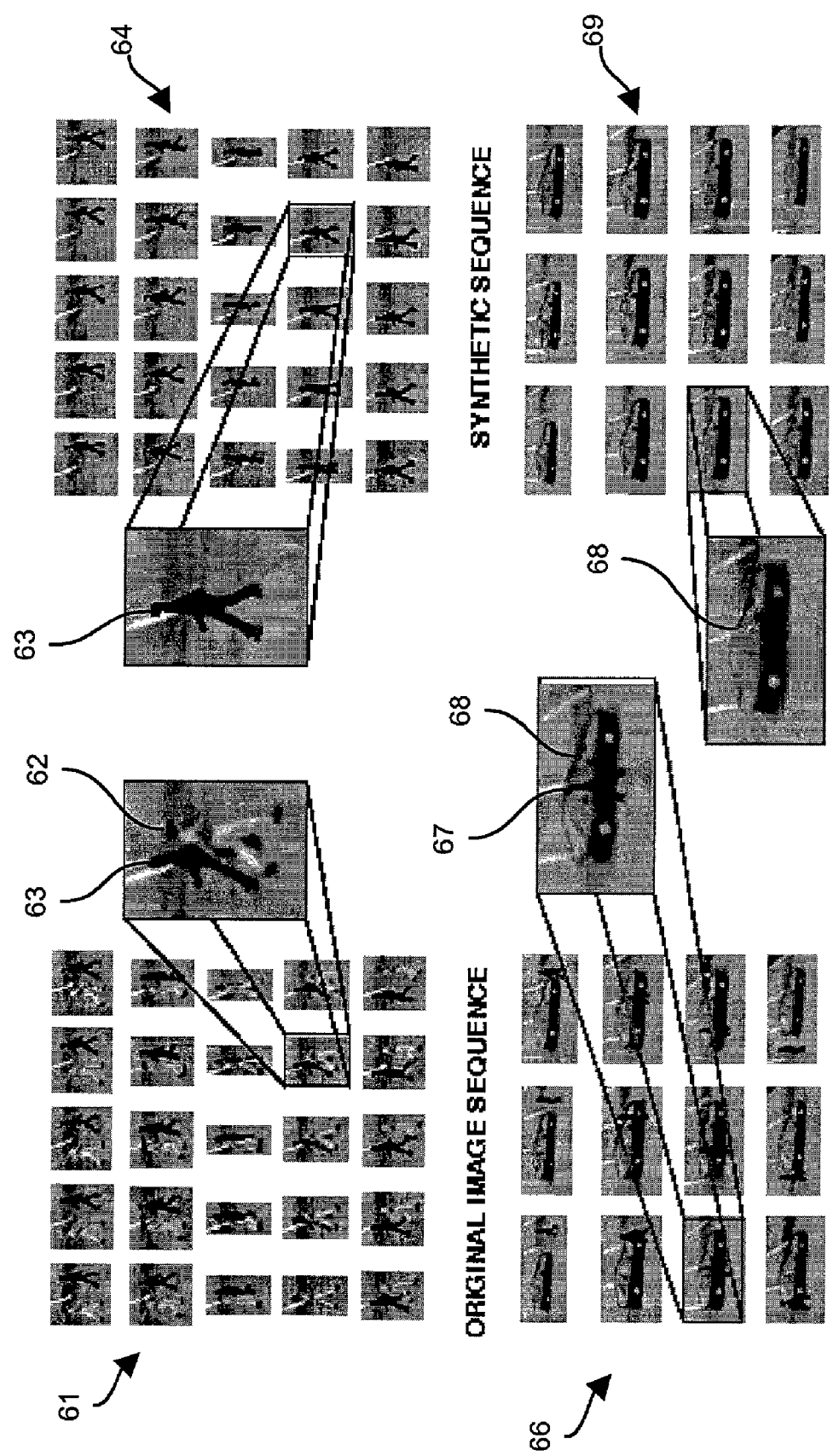
FIG. 6 illustrates an example of synthesizing a synthetic character.

FIG. 6 illustrates an example of producing a synthetic character. The example is taken from Virtual Postman. In FIG. 6, a synthetic character is used to replace a real character that is occluded. The image sequences 61, 66 are the image sequences from two source video streams. In both cases, a front-most character 62, 67 is "killed," and an occluded character 62, 68 remains in the video sequence. A synthetic image sequence 64, 69 of the occluded character 63, 68 is generated based on the periodic sequence of the occluded character 63, 68.

In block 17, command interpretation is performed and produces video manipulation commands 14 based on input from the user 15 and the computation engine 16. The user 15 and the computation engine 16 direct the production of the virtual video stream via the command interpretation 17. The insertion and/or removal of a synthetic character and/or a foreground object is directed by the user 15 and/or the computation engine 16. Control over the insertion and/or removal of a synthetic character includes control over appearance, scale, position, speed, direction of motion, timing, etc. of the synthetic character. The software control via the computation engine 16 is preordained and/or randomized.

The command interpretation 17 directs the video manipulation 13 as to what characters and/or foreground objects are modified, inserted, and/or removed based on input from the user 15 and the computation engine 16. For example, for Virtual Postman, if a user 15 users a mouse and clicks on a foreground object (e.g., a "live" person), the command interpretation 17 determines that the clicked-on "live" person must be removed from the virtual video. As another example using Virtual Postman, if the computation engine 16 determines that a zombie must be inserted a particular place and time in the virtual video, the command interpretation 17 directs the insertion of the zombie. As an example based on video editing, if a user points and clicks a mouse on a frame after pre-selecting a character, the command interpretation 17 directs the insertion of a synthetic character based on the selected character at the clicked-on location in the frame.

In block 22, the virtual video stream is assembled on a frame-by-frame basis by performing insertion of synthetic characters and/or removal of foreground objects. The assembly of the virtual video stream uses the synthetic characters 20 from video manipulation 13 and the background components 21 from the background model 6 to produce overlays 23. The overlays 23 include foreground components and modifications to the background model.

Preferably, a z-buffer approach is used to place synthetic characters over a background model to obtain each frame of the virtual video stream. The synthetic characters are z-buffered onto the background model according to the apparent depth of each synthetic character. Each "live," or "real," character in the virtual video stream is extracted from the video stream in block 3 and placed on the background model as a synthetic character 20 in the same position and orientation as in the video stream in block 1.

In general, the virtual video is assembled by placing synthetic characters on the background model and not emplacing "dead" synthetic characters on the background model. When a synthetic character is inserted in the video stream, the synthetic character is placed over the background model and perhaps behind another character. When a synthetic character is removed from the video stream, the synthetic character is no longer placed in the virtual video stream over the background model. When a foreground object is removed from the video stream, the foreground object is replaced with appropriate imagery from the background model or a synthetic character. Removing a foreground object includes repairing uncovered background, other foreground objects, and synthetic characters.

The assembly of the virtual video stream uses functional areas in a frame of the virtual video stream to insert and remove a synthetic character. When inserting or removing a character in a video stream, it is imperative to know where to place the character to produce a realistic result. This is achieved by observing objects in the scene to generate labels of functional areas. Examples of functional areas include the following: regions in which vehicular or pedestrian traffic is observed are labeled as roads or footpaths; regions where vehicles enter and stop are labeled as parking lots; regions which experience a large amount of insalient motion are labeled as tree canopies; and places where people appear and disappear are labeled as doorways.

Furthermore, interactions between functional areas are useful sources of information. For example, if a vehicle is observed driving along a road, and the vehicle later appears in a parking lot, it is assumed that a navigable connection exists between the two functional areas. As another example, if a vehicle disappears at one part of an image and reappears at another point of the image, it is assumed that an occlusion exists at that location.

Figure 7:
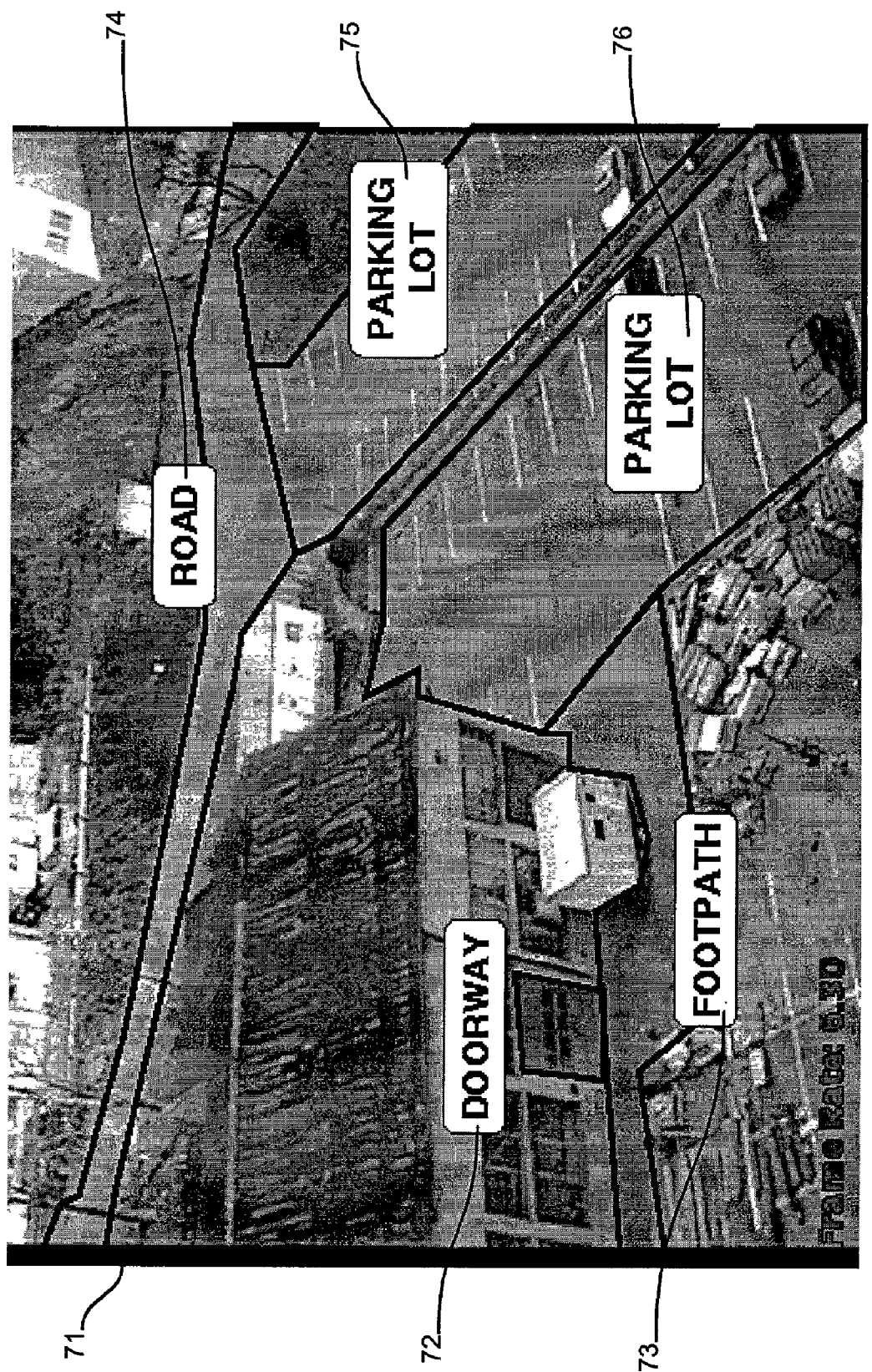
FIG. 7 illustrates an example of functional areas in a video image.

FIG. 7 illustrates functional areas in a video image. In FIG. 7, a video image 71 is decomposed into various functional areas 72–76, which are labeled by observing traffic through the scene. The functional areas 72–76 are used to place synthetic characters in the video stream, determine their scaling and speed, and determine visual occlusions.

The identification of functional areas is accomplished either manually (i.e., by a human operator labeling the functional areas) or automatically. In the automatic case, a computer-based processing system uses algorithms, such as those discussed for blocks 3 and 7 to identify and track objects in a video stream. Using the results, a decision is made based on stored characteristics of various types of functional areas which, if any, of the stored functional areas describes a portion of the video stream.

In block 24, the virtual video stream is rendered by using the overlays 23 from block 22 and background components 25 from the background model 6. To render the virtual video stream, the overlays 23 are placed on the background components 25. The resulting virtual video stream is a "seamless" video stream based on the video stream from block 1.

As an overview of the technique illustrated in FIG. 1, the Virtual Postman example is used. The virtual video stream from block 1 is assembled in block 22 based on the background model of the parking lot from block 6 and synthetic characters from block 13. The "live," or "real," characters are extracted in block 3 from the video stream and placed on the background model in block 20 as synthetic characters in the same position and orientation as in the video stream in block 1. A "dead" character is removed from the virtual video by replacing the "dead" character with background components in block 22. A "live" character determined to be occluded by a "dead" character is manipulated in block 13 to account for the occlusion. Finally, zombies are placed in the virtual video stream in block 22 according to a randomized determination from the computation engine 16.

FIG. 8 illustrates a plan view for the invention. A computer system 81 comprises a computer 82 having a computer-readable medium 83 embodying software to operate the computer 82 according to the invention. The computer system 81 is coupled to a source video stream generator 84, which generates the source video stream of block 1. The computer system 81 is also coupled to a virtual video stream output device 85, which receives the virtual video stream rendered in block 24. Examples of the virtual video stream output device 85 include: a display; a monitor; a network; and a computer-readable medium. As an option, instead of being exterior to the computer system 81, the source video stream generator 84 is interior to the computer system 81. As an option, instead of being exterior to the computer system 81, the virtual video stream output device 85 is interior to the computer system 81.

The invention has applications in numerous areas, for example: entertainment; simulations; interactive video; teleconferencing; distance learning; and video transmission/storage.

Entertainment applications of the invention include using a video stream as the playing field in a computer game, such as in Virtual Postman. With the invention, games are able to use a real time or delayed source video stream for the background, players, and/or interactive characters and objects.

Simulations are greatly enhanced with the invention by the ability to add and remove one or more objects from a video stream. For a simulation, a real video scene is used as a basis for the simulation. For example, in a military simulation, characters, such as enemy or friendly soldiers, tanks, ships, etc., are placed in the virtual video stream based on stored synthetic characters. The numbers and types of such characters are adapted to the particular situation being simulated. For example, as enemy soldier characters are killed, the dead enemy soldiers are removed from the virtual video stream. As another example, reinforcements are added interactively during the course of the simulation.

Using a virtual video stream for simulations has several advantages. First, simulated objects and scenes are able to be derived from video streams and therefore will be photo realistic, as opposed to stylized computer generated models. Further, simulated objects are able to be transmitted as imagery, rather than 3D models which saves on bandwidth. Being able to visualize photo realistic simulated scenes in a video format is a useful tool for both military training and mission planning, as well as in other simulation applications.

For interactive video, a user edits a source video stream using the invention. As a product, the ability to manipulate a video stream is able to be packaged into a Photoshop™-type package, but for movies instead of photographs. A user is able to add and remove objects in home movies and studio productions. For example, a particular character is able to be inserted into or removed from a scene in a video stream to produce a desired video sequence, which is different from the original video sequence. As another example, one or more objects are added into and/or removed from a home video or a pre-packaged video.

For teleconferencing, the source video stream of the teleconference is able to be modified from any side into a virtual video stream. With virtual video capability for teleconferencing, people or other objects are able to be removed from the scene for privacy reasons or add objects to illustrate a point.

Using the invention to augment distance learning, a class instructor adds, deletes, and/or manipulates one or more objects in a video stream to obtain a virtual video stream.

Using the invention to augment video transmission/storage, the amount of information that must be transmitted or stored is reduced. With the invention, the modeling of the motion of an object as a periodic sequence permits a reduction in the information describing the object. The periodic sequence of the object and parameters describing the manipulation of the object (e.g., translation, scale, orientation, appearance, etc.) are a compressed version of the object and are transmitted or stored for placement in virtual video stream.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method comprising the steps of:
   extracting an object of interest from a video stream;
   analyzing said object from said video stream to obtain an analyzed object, said step of analyzing comprising at least one of the steps of determining a rigidity of said object, determining a periodic sequence corresponding to said object, or determining a periodic sequence corresponding to said object and at least one parameter describing an appearance of said object;
   manipulating said analyzed object to obtain a synthetic character; and
   assembling a virtual video using said synthetic character.

2. The method of claim 1, wherein said step of extracting comprises the step of employing a stochastic background modeling technique to detect said object in said video stream.

3. The method of claim 1, wherein said step of extracting comprises the step of employing a motion detection technique to detect said object in said video stream.

4. The method of claim 1, wherein said step of extracting comprises the step of employing a segmentation technique to detect said object in said video stream.

5. The method of claim 1, wherein said step of extracting comprises the step of extracting background components from said video stream.

6. The method of claim 1, wherein said step of extracting comprises the steps of:
   determining if a pixel in a frame of said video stream represents an object that is moving based on a stochastic model of a background scene in said frame; and
   clustering pixels in said frame that represent said object that is moving.

7. The method of claim 1, further comprising the step of tracking said object.

8. The method of claim 7, wherein said step of tracking comprises the steps of:
   identifying a position of said object in a frame of said video stream;
   identifying candidate objects in a next frame of said video stream; and
   comparing said object in said frame with candidate objects in said next frame to determine a next position of said object in said next frame.

9. The method of claim 1, wherein said step of determining said rigidity comprises the step of determining a residual flow for said object.

10. The method of claim 1, wherein said periodic sequence represents one cycle of motion of said object over a series of frames, and wherein said periodic sequence comprises, for each frame of said set of frames, a visual appearance of said object and a frame-to-frame displacement of said object.

11. The method of claim 1, wherein said step of determining said periodic sequence comprises the steps of:
   collecting a set of visual templates of said object from a series of frames of said video stream, said set of visual templates comprising at least one complete period of motion of said object; and
   matching a present visual template of said object with each visual template of said set of visual templates to determine a starting point of said period of motion of said object.

12. The method of claim 11, wherein said step of matching comprises the steps of:
   determining a convolution of said present visual template with each visual template of said set of visual templates; and
   selecting said starting point of said period of motion based on a minimum of said convolution.

13. The method of claim 1, further comprising the step of transmitting or storing said periodic sequence and said at least one parameter.

14. The method of claim 1, wherein said step of manipulating is directed by a user.

15. The method of claim 1, wherein said step of manipulating is directed by a computation engine.

16. The method of claim 1, wherein said synthetic character is a hybrid based on said object of interest and computer-generated imagery.

17. The method of claim 1, further comprising the step of providing a second synthetic character generated by a computer graphics engine, and wherein said step of assembling comprises the step of assembling said virtual video using said synthetic character and said second synthetic character.

18. The method of claim 1, wherein said step of assembling comprises the step of inserting said synthetic character into said video stream.

19. The method of claim 18, wherein said synthetic character is inserted based on rigidity and periodicity of said synthetic character.

20. The method of claim 18, wherein said step of inserting comprises the steps of:
   selecting a starting frame in said video stream and a position within said starting frame for inserting said synthetic character; and
   inserting a periodic sequence corresponding to said synthetic character beginning in said starting frame and at said position.

21. The method of claim 20, wherein said periodic sequence represents one cycle of motion of said synthetic character, and wherein said periodic sequence comprises, for each frame of said set of frames, a visual template of said synthetic character and a frame-to-frame displacement of said synthetic character.

22. The method of claim 21, wherein said step of inserting further comprises the step of multiplying each visual template by a scale factor to adjust a size of said synthetic character.

23. The method of claim 21, wherein said step of inserting further comprises the step of multiplying each frame-to-frame displacement by a time factor to adjust a speed of motion of said synthetic character.

24. The method of claim 21, wherein said step inserting further comprises the step of applying a flip operator to each visual template to reverse a direction of motion of said synthetic character relative to a direction of motion of said synthetic character in said periodic sequence.

25. The method of claim 18, wherein said synthetic character is occluded in said video stream.

26. The method of claim 18, wherein said step of inserting comprises the step of modifying at least one of appearance, scale, position, speed, direction of motion, and timing, prior to insertion of said synthetic character into said video stream.

27. The method of claim 1, wherein said step of assembling comprises the step of removing said synthetic character from said video stream.

28. The method of claim 27, wherein said step of removing comprises the step of filling in pixels in frames of said video stream with pixels from a background model for said synthetic character removed from said video stream.

29. The method of claim 27, wherein said step of removing comprises the step of repairing at least one of an uncovered background, a foreground object, and another synthetic character.

30. The method of claim 1, further comprising the step of determining functional areas within said video stream.

31. The method of claim 1, further comprising performing the method of claim 1 for a plurality of objects of interest in said video stream.

32. The method of claim 1, wherein said steps of extracting, analyzing, manipulating, and assembling are performed in real time.

33. The method of claim 1, wherein at least one of said steps of extracting, analyzing, manipulating, and assembling is performed in non-real time.

34. The method of claim 1, wherein said video stream comprises a background for a game.

35. The method of claim 1, wherein said video stream comprises a simulation.

36. The method of claim 1, wherein said video stream comprises a teleconference.

37. The method of claim 1, wherein said video stream comprises a distance education presentation.

38. A computer system to perform the method of claim 1.

39. A system comprising means for processing to perform the method of claim 1 and means for rendering said virtual video.

40. A computer-readable medium comprising software to perform the method of claim 1.

41. A method comprising the steps of:
   obtaining a video stream as a setting for one of a video game, a simulation, a teleconference, and a distance education presentation;
   tracking a moving object in said video stream;
   analyzing said moving object to obtain an analyzed moving object, said analyzing step comprising representing said moving object by a periodic sequence;
   generating a synthetic character based on a said analyzed moving object; and
   assembling a virtual video based on said synthetic character and said video stream.

42. The method of claim 41, wherein said step of generating is in response to a user of one of said video game, said simulation, said teleconference, and said distance education presentation.

43. The method of claim 41, wherein said step of assembling comprises the step of inserting said moving object into said virtual video based on said synthetic character.

44. The method of claim 41, wherein said step of assembling comprises the step of removing said moving object from said virtual video based on said synthetic character.

45. A computer system to perform the method of claim 41.

46. A system comprising means for processing to perform the method of claim 41 and means for rendering said virtual video.

47. A computer-readable medium comprising software to perform the method of claim 41.

48. A method comprising the steps of:
   extracting in real time a background model from a video stream;
   generating in real time a synthetic character;
   identifying a functional area in said video stream; and
   assembling in real time a virtual video based on said background model, said synthetic character, and said functional area.

49. A method as in claim 48, wherein said step of generating comprises generating said synthetic character using a computer graphics engine.

50. A method as in claim 48, further comprising the step of extracting in real time an object of interest from said video stream, and wherein said step of generating comprises generating said synthetic character using said object.

51. A method as in claim 48, further comprising the step of extracting in real time an object of interest from said video stream, and wherein said step of generating comprises generating said synthetic character using said object and a computer graphics engine.

52. A computer system to perform the method of claim 48.

53. A system comprising means for processing to perform the method of claim 48 and means for rendering said virtual video.

54. A computer-readable medium comprising software to perform the method of claim 48.

* * * * *